W. CALL, Jr.
Seed-Planters.
No. 139,943. Patented June 17, 1873.
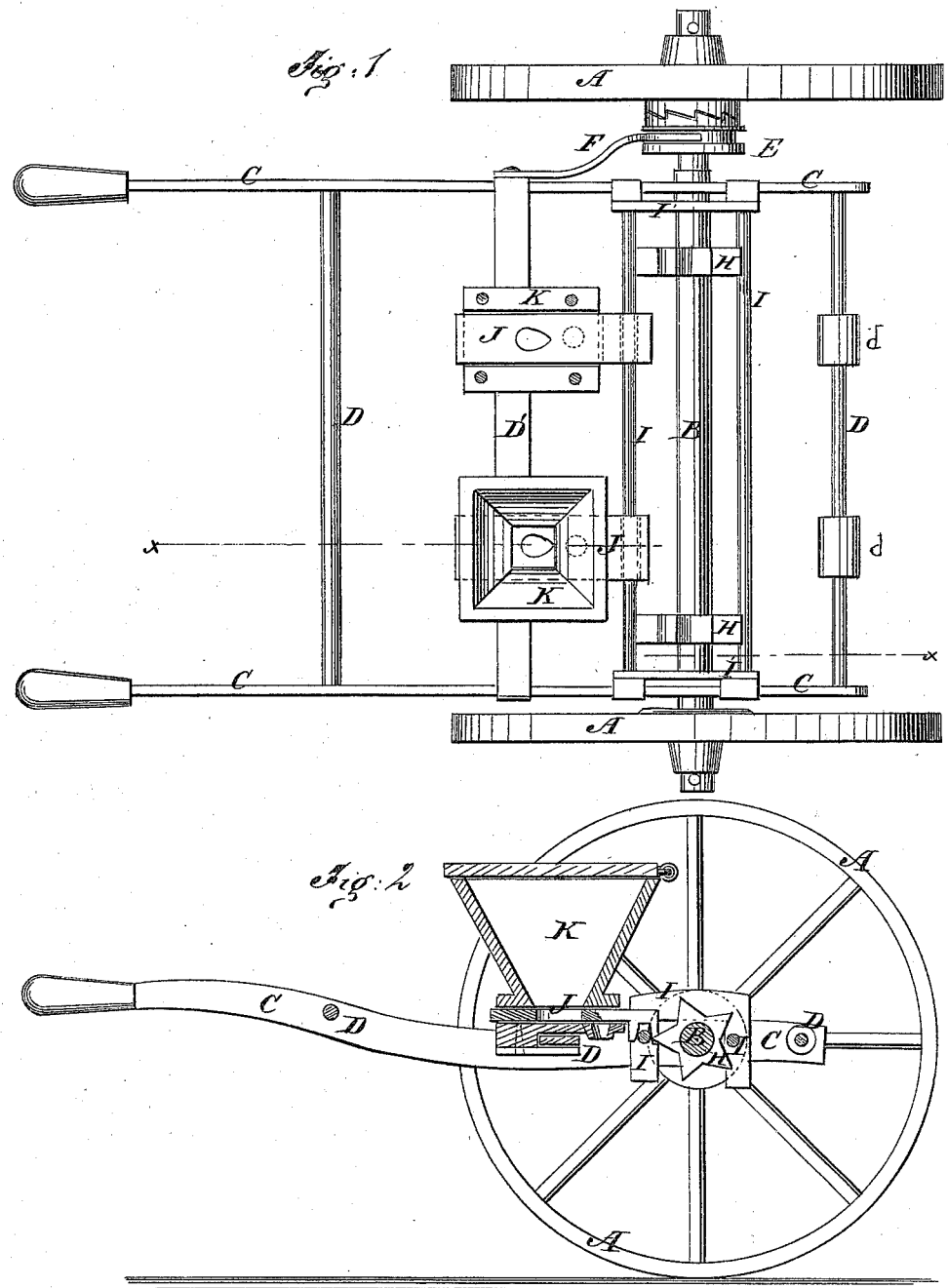

UNITED STATES PATENT OFFICE.

WILLIAM CALL, JR., OF HAVERSTRAW, NEW YORK.

IMPROVEMENT IN SEED-PLANTERS.

Specification forming part of Letters Patent No. 139,943, dated June 17, 1873; application filed March 15, 1873.

*To all whom it may concern:*

Be it known that I, WILLIAM CALL, Jr., of Haverstraw, in the county of Rockland and State of New York, have invented a new and Improved Seed-Planter; and I do hereby declare that the following is a full, clear, and exact description of the same, reference being had to the accompanying drawing forming a part of this specification, in which—

Figure 1 is a top view of the planter. Fig. 2 is a detail vertical section of the same taken through the line $x\ x$, Fig. 1. Fig. 3 is a detail section of the wheel and clutch.

My invention has for its object to furnish an improved machine for planting seeds; and consists in a sliding frame and a main frame, in combination with sliding hoppers and sliding holders for the furrow-openers, as hereinafter fully described.

A are the wheels, B the axle, C the bars, and D D' cross-bars. E is a clutch which slides upon the axle B, is pressed out against the wheel A by a spring, F, and is held by a pin, G, to axle. Upon the axle B are secured star-cams H, by which the dropping slides are operated. The main frame consists of two long bars, C C, connected by three cross-bars, D D D, while the auxiliary frame consists of two long bars, I I, connected by short bars I' I' having sockets that enable the frame to slide upon the bars C C. On the front bar I is pivoted the seed-dropping slides J J of the hoppers K K. The latter rest upon the flat bar D', while the pivot-blocks $d\ d$ (of the furrow-openers) are arranged to slide on the rear bar D. By this construction the hoppers and furrow-openers may always be adjusted to rows of different distances apart. H H are star-cams which turn with the axle and operate sliding frame I in a suitable manner, each angle of the cam thus successively actuating the seed-slide in either direction.

Having thus described my invention, what I claim as new and desire to secure by Letters Patent, is—

The main frame, consisting of two bars, C C, and three cross-bars, D D D', the sliding frame I I', and the sliding hoppers, combined and relatively arranged in connection with a cammed axle on wheels, substantially as and for the purpose described.

WILLIAM CALL, JR.

Witnesses:
GEORGE EDGAR COSGROVE,
ABRAM F. FELTER.